(12) United States Patent
Manoski et al.

(10) Patent No.: US 6,270,818 B1
(45) Date of Patent: Aug. 7, 2001

(54) ANIMATED FOOD, FOOD ADDITIVE AND METHOD

(75) Inventors: Paula M. Manoski, Barrington; Michelle Salazar, Glenview; John J. Smith, Hoffman Estates; Robert F. Boutin, Hinsdale; Thomas J. Hinkemeyer, Gages Lakes, all of IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/469,918

(22) Filed: Dec. 22, 1999

Related U.S. Application Data

(62) Division of application No. 09/108,513, filed on Jul. 1, 1998, now Pat. No. 6,159,511.

(51) Int. Cl.[7] ............................. A23L 1/164; A23L 1/18
(52) U.S. Cl. .................. 426/94; 426/96; 426/293; 426/295; 426/297; 424/489
(58) Field of Search ................ 426/94, 96, 293, 426/295, 297; 424/489

(56) References Cited

U.S. PATENT DOCUMENTS

| | | | |
|---|---|---|---|
| 3,867,556 | * 2/1975 | Darragh et al. | 426/98 |
| 3,922,354 | 11/1975 | Galluzzi et al. | 426/96 |
| 4,515,769 | * 5/1985 | Merritt et al. | 424/49 |
| 4,568,560 | * 2/1986 | Schobel | 427/3 |
| 4,804,548 | 2/1989 | Sharma et al. | 426/96 |
| 4,853,235 | 8/1989 | Tomomatsu | 426/93 |
| 4,981,698 | 1/1991 | Cherukuri et al. | 426/5 |
| 5,064,650 | * 11/1991 | Lew | 424/435 |
| 5,607,708 | 3/1997 | Fraser et al. | 426/96 |
| 5,622,739 | 4/1997 | Benton et al. | 426/74 |
| 5,743,404 | 4/1998 | Melashenko et al. | 206/524.3 |
| 5,804,235 | 9/1998 | Altschul | 426/104 |

FOREIGN PATENT DOCUMENTS

| | | |
|---|---|---|
| 0 781 510 | 7/1997 | (EP) . |
| 416 970 | 9/1934 | (GB) . |
| 1 596 765 | 8/1981 | (GB) . |
| 2 306 290 | 5/1997 | (GB) . |
| WO 97/19604 | 6/1997 | (WO) . |

* cited by examiner

Primary Examiner—Nina Bhat
(74) Attorney, Agent, or Firm—Lars S. Johnson

(57) ABSTRACT

An animated food, containing a food animating product and method is disclosed. The animating food product is edible and animates the food by dispersing an outer mass in liquid and revealing an inner mass of the animating food portion that is different in appearance from the appearance of the animating mass prior to dispersion.

56 Claims, 2 Drawing Sheets

ANIMATED FOOD, FOOD ADDITIVE AND METHOD

This is a divisional of U.S. patent application Ser. No. 09/108,513 filed Jul. 1, 1998, now U.S. Pat. No. 6,159,511.

FIELD OF THE INVENTION

This invention relates to an animated food, food additive and method. More particularly, the invention relates to an animated cereal that contains an edible food additive that animates the cereal. The food additive is composed of an inner substantially non-dispersible in water solid edible mass contained within an outer water dispersible solid edible mass, the inner mass being different in appearance from the outer mass.

BACKGROUND OF THE INVENTION

Hot and cold cereals have been a staple of the human diet for many years. However, developments to cereals, both hot and cold have been primarily in the flavor, texture and appearance of the cereal. As used herein, "cereal" means a food made from grain such as oatmeal, corn flakes and puffed rice, for example, and optionally including additives, including but not limited to sugar, vitamins, flavors, preservatives and colorants.

Cereal, both hot and cold, is often a staple of a child's diet as well. However, it is sometimes difficult to encourage some children to eat his or her food, and sometimes the most nutritious food, such as oatmeal, as well as other cereals, are not readily consumed by children.

In view of the foregoing, a need exists for a cereal additive and resultant cereal that would encourage consumption, particularly among children. A need also exists for a method of efficiently producing the additive.

SUMMARY OF THE INVENTION

In accordance with the present invention, an edible animated food is provided that comprises a mixture of an edible food, such as cereal, for example, and an animating edible food. The animating edible food is composed of an inner substantially non-dispersible in water solid edible mass encased in an outer water dispersible solid edible mass, the inner mass being different in appearance from the outer mass, namely a difference in color, shape, size or a combination thereof.

As used herein, "animated" means that an observable change in the cereal occurs that provides or simulates giving life, making alive or otherwise providing a visually stimulating change, including but not limited to the hatching or simulated hatching of an egg, the transformation of one object into another thing (e.g., changing a horse into a car or one cartoon character into another cartoon character, for example). The animation is provided by the dispersion of the outer mass which reveals the inner mass. For example, the inner mass can be of a shape that holds a person's interest and is of a size sufficient to provide a discernible shape to the unaided eye, such as the shape of a dinosaur or well-known cartoon character and the outer mass or coating can be in the shape of an egg or smooth pebble. The food can be either a food intended to be consumed when it is hot, (e.g., oatmeal, for example) or when cold (e.g., corn flakes, for example).

In accordance with one embodiment of the invention, the food is either a hot cereal or a cold cereal. By "hot" food or cereal is meant that the food is intended to be consumed with a fluid, usually containing water, when at elevated temperature (e.g., hot, such as above 90° F. for example) and by "cold" food or cereal is meant that the food is intended to be consumed at ambient temperature and/or with an ambient temperature or cold liquid, such as cold milk or water, for example or other aqueous fluid. The presence of the animating additive encourages interaction by the consumer in mixing and observing the food additive in the food (cereal) particularly as the outer mass disperses to reveal the inner mass, thereby providing the animating effect.

In accordance with one embodiment, the outer mass is generally egg-shaped and the dispersion of the outer solid edible mass simulates the hatching of an egg to reveal the inner mass which can be an animal shape (e.g., a dinosaur, for example) or any other desired shape.

In one embodiment, based upon the materials utilized, the outer solid edible mass disperses in hot water, such as above a minimum temperature for dispersion, which generally is above about 100° F. and preferably above about, for example, 110° F., 115° F., 120° F., 130° F., 135° F., 140° F., 150° F., 210° F. or more, but not below the chosen temperature and not at ambient temperature which as used herein is about 75° F. In accordance with the invention, the composition of the outer mass can be selected based on melting point temperature to provide a desired minimum dispersion temperature and time. Upon dispersion of the outer mass, the inner mass is revealed. In accordance with a more specific embodiment, the outer solid edible mass disperses in hot water by melting. The solid edible mass may be composed of an edible fat of a desired melting point or melting point range and sugar.

In accordance with another aspect of the invention, the outer edible solid mass disperses in a cold liquid, generally an aqueous liquid such as water or milk, for example, at a temperature in the range of about 35–50° F. or greater, for example.

In accordance with another aspect of the invention, a method of making discrete food pieces is provided that includes forming a substantially non-dispersible in water solid edible mass and encasing the substantially non-dispersible edible solid mass in a water dispersible solid edible mass. A plurality of individual food pieces can be separately encased substantially simultaneously in accordance with the invention.

In one embodiment, the non-dispersible in water solid edible mass is formed of a substantially water dispersible solid edible mass that is coated with a non-dispersible in water solid edible coating to thereby protect the coated water dispersible solid edible mass from dispersion in water and render the mass non-dispersible in water. Thereafter, the resulting coated inner mass which has been rendered non-dispersible in water is encased or coated with a water dispersible solid edible outer mass. Usually the thickness and/or shape of the outer mass is sufficient to alter or conceal the shape of the coated inner substantially non-dispersible in water solid edible mass and, for example, can be in the range of from about 0.25 to about 4 millimeters in thickness.

In accordance with one aspect of the invention, the edible food is composed of an inner substantially non-dispersible in water solid edible mass contained within an outer water dispersible solid edible mass, the inner substantially non-dispersible in water solid edible mass being different in appearance from the outer mass. The difference in appearance may result from differences in color, shape, size or any combination of color, shape and size between the inner and outer masses.

As used in this specification, the term "dispersible" means that when a solid mass is placed in a liquid, a dispersion occurs, namely, the solid mass disperses in the liquid. The dispersion can occur by melting, by dissolving into the liquid (i.e., as in a true solution) or by dispersing into smaller solid particles, as in a colloidal or non-colloidal solid/liquid dispersion or a liquid/liquid dispersion, for example. Generally, dispersing should occur in a relatively short period of time, such as from about 15 seconds to about 2 or 3 minutes, for example. This is because longer times would not generally maintain the interest of the person who is consuming the food that contains the food additive, and a shorter time generally would be too fast for observation by the consumer. By "non-dispersible" is meant that the inner mass does not disperse for at least about 3 to 5 minutes or more and preferably 8 minutes, 10 minutes or more after exposure to the intended fluid medium and temperature, such as water at about 150° F., for example. Thus, the term non-dispersible is not limited to absolute non-dispersibility but also includes materials having a degree of non-dispersibility based on time and temperature parameters (i.e., the inner mass does not dissolve for at least a minimum predetermined period of time (3 minutes, for example) in a liquid (water, for example) at a specified temperature (180° F., for example). In addition, the terms "non-dispersible in water" and "water dispersible" as used herein are not limited to dispersibility or non-dispersibility in water, but refer to dispersibility or non-dispersibility in any aqueous composition or environment.

In accordance with another aspect of the invention, an edible food is provided in which a desired or an otherwise known, recognizable or well-recognized shape (such as, for example, an animal, a dinosaur, a cartoon character or an item (a car, for example)) forms the inner substantially non-dispersible in water solid edible mass of a size that can be viewed by the unaided eye and is contained within an outer water dispersible solid edible mass, the outer mass being of a different appearance from the inner mass. For example, the outer mass may form a covering over the inner mass, such as an egg-shaped or pebble-shaped outer mass containing and encasing the inner mass. The different appearance can result from a different shape, a different color or combinations of different shape and color. In accordance with another aspect of the invention, the outer mass is in the shape of a well-recognized thing (i.e., an animal (e.g., a horse) or cartoon character) and the inner mass is in the shape of a different well-recognized thing (i.e., another animal or thing (e.g., a car) or another cartoon character).

The edible food can be incorporated into other food, such as a hot cereal (e.g., oatmeal), a cold cereal (e.g., corn flakes) or any other desired food, particularly those that are intended for consumption in an aqueous fluid or sauce.

DETAILED DESCRIPTION OF THE DRAWINGS

Figure 1:
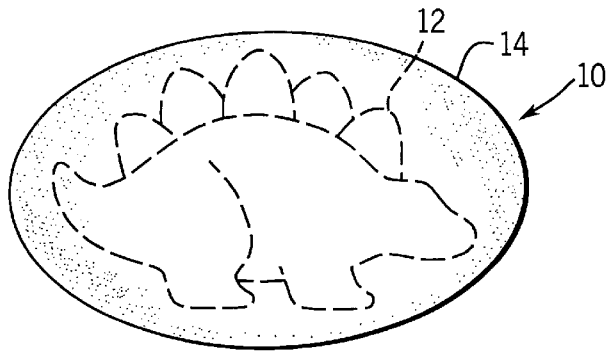
FIG. 1 illustrates an edible food in accordance with the invention, illustrating in outline form the encased inner mass of the edible food.
Figure 5:
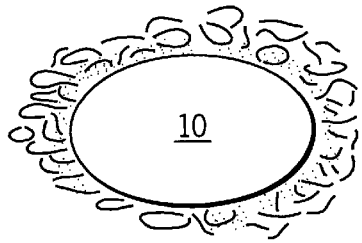
FIG. 5 illustrates a single piece of the food depicted in FIG. 1.
Figure 6:
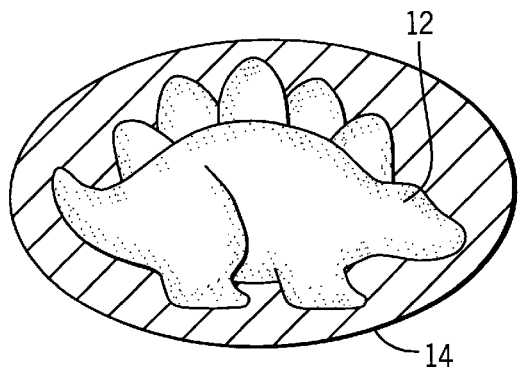
FIG. 6 illustrates the food piece of FIG. 1 with a portion of the outer mass removed to reveal the shape of the inner mass contained therein.

Referring to the figures generally and in particular to FIGS. 1 and 5 and 6, there is illustrated an edible food 10 which in this case is in the shape of an egg or a small, smooth pebble. Edible food 10 is composed of an inner mass 12 and an outer mass 14 that contains and encases inner mass 12. In the illustrated embodiment, inner mass 12 is in the shape of a dinosaur.

FIG. 6 illustrates edible food 10 with a portion of outer mass 14 being removed to reveal the shape of inner mass 12. As illustrated, outer mass 14 is a solid material that completely encases inner mass 12. While edible food 10 can be of any desired shape and size, in the illustrated embodiment it has a smooth pebble or egg shape, a length of about 0.5 inches, a height of about 0.387 inches and a thickness of about 0.25 inches and otherwise generally should be of sufficient size to provide a discernible shape to the unaided eye.

Inner mass 12 may be composed of any of a wide variety of materials or combinations of materials as long as the composition of inner mass 12 is edible.

Figure 8:
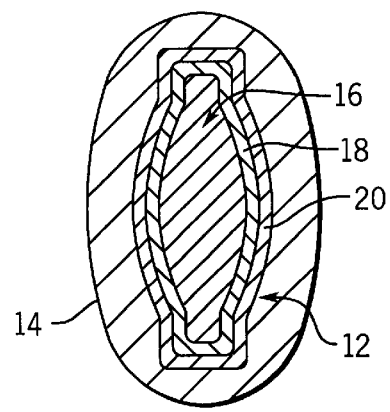
FIG. 8 illustrates a cross-sectional view of a food piece of FIG. 2 along lines 8—8 of FIG. 2.

Referring to FIG. 8, in the illustrated embodiment, inner mass 12 is composed of a substantially water dispersible solid edible mass 16 that is coated with non-dispersible in water solid edible inner and outer coatings 18 and 20, respectively.

Dispersible in water solid mass 16 can be formed into a solid unitary mass by any suitable process known to those skilled in the art, such as by the well known process of tableting. Thus, dispersible in water solid mass 16 can be, in effect, a tablet of a desired shape and composition. In the tableting process, the composition for solid mass 16 is formulated in granulated form and fed to the tableting machine where it is compressed into the desired shape. Most commonly, a rotary tablet press will be utilized in which a die corresponding to the desired shape is filled with the particulate material which forms the composition of mass 16. Thereafter, the granular material in the die is compressed for a length of time and under suitable pressure to cause the particulate material to bond together as a result of the compression. After the tablet has been formed, it is ejected from the die cavity.

While other edible materials could be used such as protein, starch and fiber, the substantially water dispersible solid edible mass 16 typically includes a base (which may be of any edible compressible material, such as sugar, starch, carboxymethylcellulose polyols and mixtures thereof), a dispersibility retardant limiting agent (such as powdered or liquid shortening, for example), a lubricant or mold release agent (such as calcium stearate or other stearate, for example) and optionally flavors and colors. Any suitable sugar can be utilized for the base, including dextrose (such as Endex available from Mendell Co., Cantab available from Penford Food Ingredients Co., and Royal T available from CPC Co., for example) and/or sucrose (such as Dipac available from Domino Sugar Co., for example). Coloring and flavoring materials can also be added to the mass 16, as can other materials, such as vitamins, as desired.

A typical composition will comprise about 85–95% base, about 2–12% dispersibility limiting or reducing agent (e.g., a shortening), and about 0.5–1% of a mold release agent and colors and/or flavors as desired. The base material can be produced by direct compression, wet agglomeration or dry slugging of the ingredients for the base.

After solid mass 16 is formed, it should be rendered at least relatively non-dispersible in the intended liquid medium where it will be in use. For example, in one embodiment, when edible food 10 is intended for use in a hot cereal such as oatmeal, it is generally desired that inner mass 12 have resistance to dispersion in hot water for at least about 2 and preferably about 3–5 minutes or more at a constant temperature of about 180° F. and about 3–10 minutes at a constant temperature of from about 140° F.–150° F. Ordinary tablets composed of sugar, binder and lubricant generally will not possess such characteristics. Consequently, in accordance with one embodiment of the invention, a protective coating is applied over solid mass 16 to provide the desired degree of non-dispersibility. Any protective coating that provides the desired degree of non-dispersibility can be used as long as it is food compatible and otherwise compatible with the materials of edible food 10.

Various types of coatings can be used to provide the desired degree of non-dispersibility. Known materials for forming a coating on solid mass 16 include various types of waxes and glazing materials, such as confectioner's glaze. Preferably, solid mass 16 has two coatings, first or inner coating 18 composed of a wax and second or outer coating 20 composed of a confectioner's glaze. Most preferably, inner coating 18 is comprised of beeswax (which can be bleached beeswax) and carnauba wax, such as about 50% beeswax and about 50% carnauba wax mixture on a weight basis. The wax can be applied to form inner coating 18 by any suitable process, such as by spraying the wax (usually in the presence of a solvent for the wax) or by tumbling solid mass tablets 16 in dry or liquid wax. A suitable solvent for beeswax and carnauba wax is ethyl alcohol. Preferably, the thickness of the wax coating is in the range of from about 0.001 to about 0.05 millimeters.

After inner coating 18 is formed on solid mass 16 and dries and/or solidifies, outer coating 20 of confectioner's glaze is applied. The confectioner's glaze can be applied by any suitable method known to those skilled in the art including spraying, dipping, brushing or any other suitable technique. Usually, the confectioner's glaze will be present in alcohol solution. Several coatings of the confectioner's glaze can be applied, as desired. Each of coatings 18 and 20 should be continuous coatings and generally coating 20 should be allowed to sufficiently cure to form a coating more resistant to dispersion prior to application of outer mass 14.

It is beneficial to utilize an inner coating that is impervious to the confectioner's glaze liquid carrier or solvent prior to application of the confectioner's glaze. Confectioner's glaze is usually dissolved in alcohol, and this alcohol could otherwise penetrate into solid mass 16 in the absence of inner coating 18 and alter the taste of tablet 16 in an undesirable manner. Consequently, inner coating 18 should preferably be alcohol impermeable when an alcohol solvent is used in the application of the confectioner's glaze to form outer coating 20 (or otherwise impermeable to the coating and/or solvent used to apply a second coating, if present).

After outer coating 20 has been applied and cured, inner mass 12 is ready for containment by outer mass 14. Outer mass 14 provides an aqueous dispersible coating that contains and encases inner mass 12. Outer mass 14 is in effect a relatively thick coating that is dispersible in the desired liquid, such as an aqueous liquid (such as water, milk, oatmeal or other foods that are aqueous based). In the embodiment for use in hot foods (such as oatmeal), outer mass 14 disperses above about 150° F. after an exposure time between about 10 seconds and 30 seconds.

Generally, outer mass 14 is sufficiently thick so that the shape, color and/or size of inner mass 12 cannot be discerned by inspecting the shape of outer mass 14.

For use in a hot aqueous medium in a preferred embodiment, water dispersible outer mass 14 is composed of edible fat and sugar, with the fat having a melting point that is in the desired dispersion temperature range for outer mass 14. Preferably, for dispersion of the outer water dispersible solid edible mass to occur in the temperature range of from about 150° F. to about 200° F., the fat contained in the outer water dispersible solid edible mass will typically have a melting point in the range of about 112° F. to about 150° F. Typical fats include cocoa butter, coconut oil, partially hydrogenated vegetable oils, such as palm, soybean, cottonseed and mixtures thereof, for example. Preferred fats include partially hydrogenated vegetable oils, such as palm, soybean, cottonseed and mixtures thereof. Thus, when food 10 is placed in an aqueous medium at or above the solution temperature of the material forming outer mass 14, outer mass 14 disperses into the aqueous medium revealing inner mass 12 which has a different shape and/or color from the shape of outer mass 14 prior to dispersion. In the embodiment for outer mass 14 composed of fat and sugar, dispersion occurs by melting.

Preferably, the composition of outer mass 14 is composed of from about 25–60% edible fat and from about 75–40% sugar and more preferably from about 40–60% edible fat and from about 60–40% sugar and more preferably about 50% edible fat and about 50% sugar, all on a weight basis. In addition, the composition of outer mass 14 may also contain small amounts of soy lecithin and vanillin or other flavors, as desired. The edible fat, or combination of two or more fats, is chosen to provide a desired melting point temperature or temperature range which in turn determines the temperature or temperature range at which dispersion occurs, which in this embodiment is by melting. Since outer mass 14 is relatively thick, the dispersion can desirably occur over a period of time (for example, about 3 seconds to about 3 minutes) during which the consumer interacts with the food, such as by observing and/or stirring the food, for example.

Outer mass 14 can be formed over inner mass 12 by any suitable method. One particularly preferred method is by panning with fat and sugar, which is sometimes referred to herein as "fat panning." Panning is a process that is well known in the food art in the form of "soft panning". Soft panning involves the alternating application of sugars and corn syrup to an inner material that is to be coated as they are tumbled in a revolving pan. Soft panning is often used to prepare jelly beans. The fat panning of the present invention is accomplished by the alternating application of an adhesive liquid (here composed of edible fat and sugar, for example) and dry sugar to the inner material that is to be coated as they are tumbled in a revolving pan. A typical fat panning adhesive as used herein has a composition by weight of from about 40–60% fat and from about 60–40% sugar. Alternatively, the fat panning adhesive of the present invention may comprise from 0 to about 60% fat, from about 60–40% sugar and from 0 to about 40% carbohydrates, adhesive syrup or other adhesive syrup such as corn syrup, polyol syrup or gums. In the fat panning process of the present invention, repeated application of adhesive and sugar builds up uniform coatings of desired thickness around the inner mass. Flavor and color ingredients can be added during the coating operation, as desired. The most commonly used sugar for the fat panning process is a fine or extra fine granulated, with a particle size of from about 0.2 mm to about 0.4 mm. Typically, sugar known as "baker's special sugar" is utilized for the fat panning process in accordance with the invention. Generally, the adhesive used in accordance with the present invention for outer mass 14 for dispersion in a hot aqueous medium is composed of fat and sugar. After fat panning, outer mass 14 of edible food 10 could be formed into a desired shape, such as by pressing in a die, for example.

For outer mass 14 that is dispersible in a cold aqueous liquid, such as cold water or milk, for example, a coating composed of sugar (generally without significant amounts of fat) can be utilized. Preferably, the sugar will have a softening or dispersing agent incorporated therein to promote or retard dispersion into the cold fluid, such as swelling agents, which may be fibrous in nature, modified starches that swell in water or combinations of materials having differing degrees of solubility in water, such as sucrose and lactose, maltodextrin and dextrose, maltodextrin and sucrose, crystalline fructose and dry sucrose, for example. Also, a solid material that evolves carbon dioxide in water in the presence of an acid, such as sodium bicarbonate and a food compatible acid, such as citric acid, could be used in combination which would react chemically in water to evolve carbon dioxide and cause the outer mass to disperse. In the cold aqueous embodiment, the outer mass does not melt, but rather disperses or dissolves, for example. Other edible materials that disperse to reveal inner mass 12 at a desired temperature can also be used, such as protein, starch, fiber or combinations thereof.

The following examples will assist in obtaining a further understanding of the present invention.

EXAMPLE 1

Formation of Dinosaur Tablets

Figure 7:
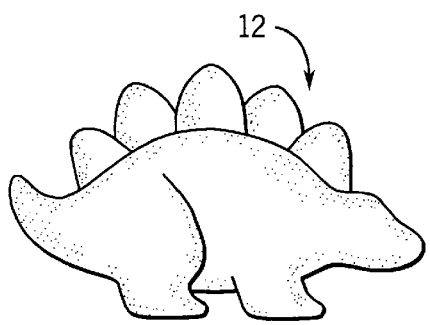
FIG. 7 is a side elevational view of the mass contained within the food piece of FIG. 1.

Inner mass 12 pieces in the shape of adult dinosaur tablets as depicted in FIG. 7 were formed from the following components.

| Ingredient | Weight in Grams | Weight Percent |
| --- | --- | --- |
| Dextrose | 4830.00 | 88.91 |
| High stable vegetable oil (AOI 500) melting point of about 141° to about 147° F. | 50.00 | 0.96 |
| Calcium Stearate (release agent) | 50.00 | 0.96 |
| Colorants and Flavors | 17.50 | 0.34 |
| Powdered shortening (retards dispersion) | 250.00 | 4.80 |
| 50/50 beeswax/carnauba wax (for coating 18) | 10.00 | 0.19 |
| Confectioner's Glaze (3.2 pounds of glaze resin per gallon of solution) (for coating 20) | 200.00 | 3.84 |
| | 5407.50 | 100.00 |

Procedure: Place dextrose into Hobart paddle mixer. Add vegetable oil and mix until uniform. Add colorants and flavors and mix until uniform. Add the Calcium Stearate and mix for 1½ minutes and form tablets on Stokes Single Station Tablet Press. Place formed tablets into a ribbed revolving pan and apply the liquid wax. Allow the tablets to tumble with the wax for 15 minutes. Spray 100 grams of the Crystalac 3.2 C. onto the pieces. Tray dry pieces overnight in a warm room at 120° F.

Spray the remaining 100 grams of Crystalac 3.2 glaze on the pieces and repeat drying process. The finished tablets have a weight of about 0.16 to 0.18 grams each, a size of about 0.30–0.31 inches (height)×about 0.50 inches (length)× about 0.120–0.135 inches (thickness) and resistance to dispersion of from about 3–5 minutes in water at 180° F.

The finished tablets in the shape of the dinosaur of FIG. 7 were then encased in outer mass 14 as set forth in Examples 2 and 4.

EXAMPLE 2

Formation of Fat and Sugar-based Adhesive for Fat Panning

An adhesive fat panning composition was formed from the following ingredients.

| Ingredient | Amount (Pounds) | Weight Percent |
| --- | --- | --- |
| 17 Stearine, 152° F.–158° F. (from Loders Croklaan) | .134020 | 13.0000% |
| Paramount XX 117° F.–119° F. (from Loders Croklaan) | .381443 | 37.0001% |
| Sugar, 6X powdered | .510824 | 49.5501% |
| Lecithin (emulsifier) | .002577 | 0.2500% |
| Colorants and Flavors | .002061 | 0.20% |

The fat panning adhesive was formed by the following procedure.

1. Place the following ingredients into large steam kettle with a lighting mixer agitator:

17 Stearine

Paramount XX

Lecithin

Turn on steam 150–160° F., no higher, and agitator.

2. Add the following ingredients when the 17 Stearine, Paramount XX and Lecithin are melted:

Powdered sugar, colorants and flavors

3. Continue to mix until smooth.
4. Run through comitrol.
5. Keep in holding tank at 140° F.–150° F. for use as fat panning adhesive.

EXAMPLE 3

Formation of Fat Panning Adhesive

Another fat panning adhesive was formed having the following formula:

| Ingredient | Weight Percent |
| --- | --- |
| KLX (Vegetable fat) | 47% |
| 17 Stearine (Vegetable fat) | 3% |
| 6X Powdered Sugar | 49.5501 |
| Lecitihin | .2500 |
| Colorants and Flavors | 0.20 |

EXAMPLE 4

Fat Panning to Form the Outer Hot Water Dispersible Mass Over the Dinosaur Inner Mass Into a rotating pan is added 300 pounds of adult dinosaur tablets from Example 1. During rotation of the pan, an initial charge of 16 pounds of the fat panning adhesive from Example 2 is added by spraying the fat panning adhesive at a temperature of about 130° F. into the rotating pan. The pan continues to rotate and when the dinosaur tablets become sticky, an initial dry charge of 16 pounds of baker's sugar is added and the pan rotation continues. When the dry sugar charge is essentially fully absorbed by the dinosaur tablet/panned coating, that fat panning cycle is completed. The cycle consisting of the spray of fat panning adhesive, the pan rotation until the tablets become sticky and the dry charge of baker's sugar and continued pan rotation is repeated for a total of 20–30 cycles, whereupon the edible food pieces 10 are removed for cooling and subsequent packaging for eventual incorporation into a desired food product. The finished pieces have a weight of about 0.6 grams each and dimensions of about 0.5 inches in length, about 0.387 inches in height and about 0.25 inches in thickness. The edible food pieces 10 should not be subjected to temperatures which cause a deleteriously effect (e.g., high temperature, such as above about 120° F., for example).

Figure 2:
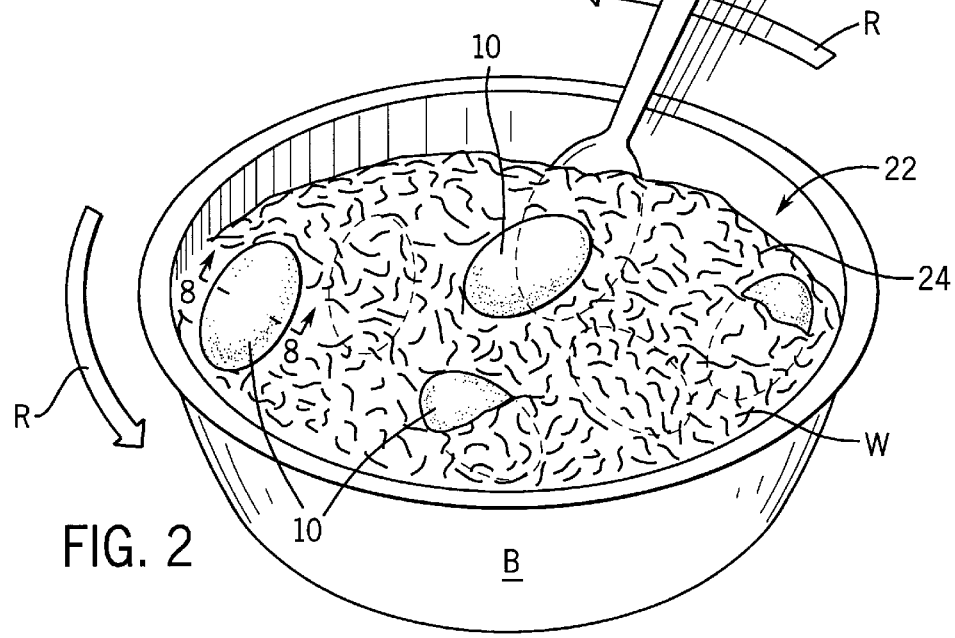
FIG. 2 illustrates an animated food in accordance with the invention prior to the animation occurring.
Figure 3:
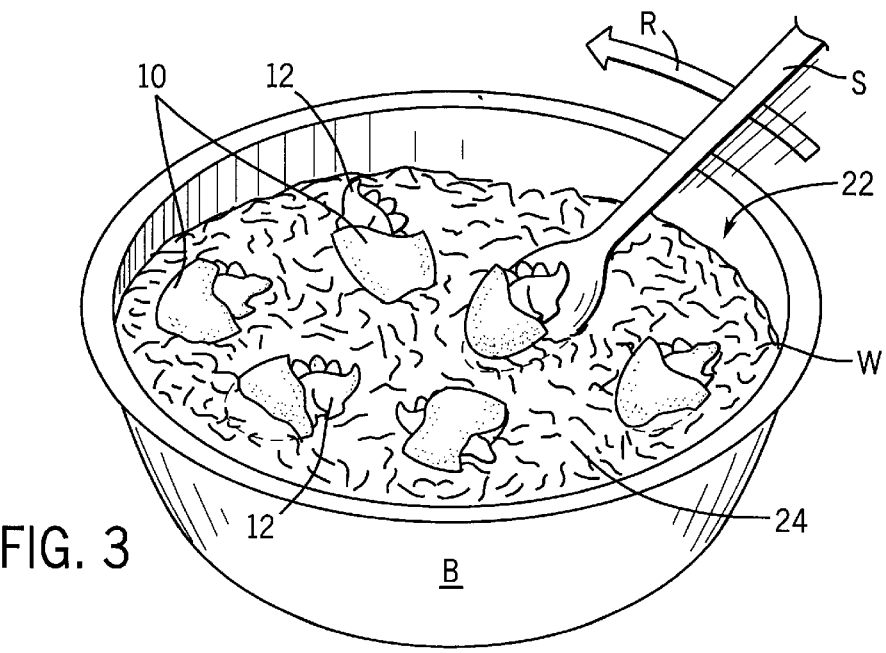
FIG. 3 shows the animated food in accordance with the invention during a portion of the animation.
Figure 4:
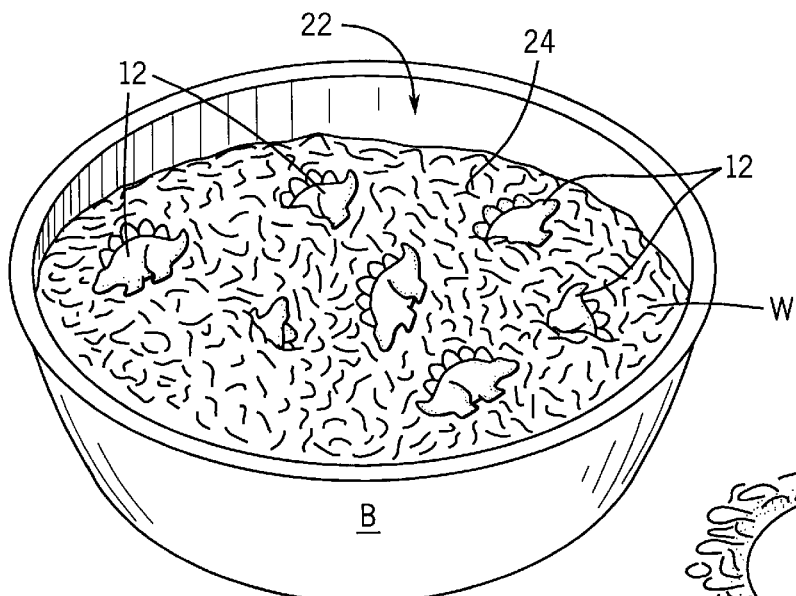
FIG. 4 illustrates the conclusion of the animation.

Referring to FIGS. 2–4, there is illustrated an animated food in accordance with the present invention. As illustrated in FIGS. 2–4, a cereal bowl B contains a quantity of hot oatmeal cereal 22. Pieces of edible food 10 have been previously added to dry oatmeal. Hot oatmeal cereal 22 is composed of oatmeal cereal 24 which may contain sugar, flavors and additives as desired and a plurality of edible food pieces 10 in a weight ratio of edible food 10 to oatmeal of about 1:5. In FIG. 2, hot water W at a temperature of about 200° F. has just been added to bowl B of oatmeal 22 while in dry form. Generally, the water when added should be at an elevated temperature above the dispersion temperature of pieces 10 since the water will begin to cool when added to bowl B absent additional heat. Since the water has just been added to oatmeal 22, edible food pieces 10 have just begun to dissolve.

As illustrated in FIGS. 2–3, a consumer (not shown) using a spoon S interacts with oatmeal 22 by mixing it gently with spoon S in the direction of arrow R to be able to periodically view edible food pieces 10, some of which are beneath the surface of the oatmeal and consequently not always visible.

Edible food pieces 10 begin dispersing upon contact with hot water W above the dispersion temperature in bowl B. As illustrated in FIG. 3, after about 30 seconds outer mass 14 of edible food pieces 10 have partially dissolved sufficiently to reveal portions of inner mass 12, which is of an adult dinosaur shape.

Upon the passage of further time, outer mass 14 has substantially completely dispersed, thereby simulating hatching and revealing the entire inner mass 12 of each edible food piece 10 as shown in FIG. 4.

Figure 9:
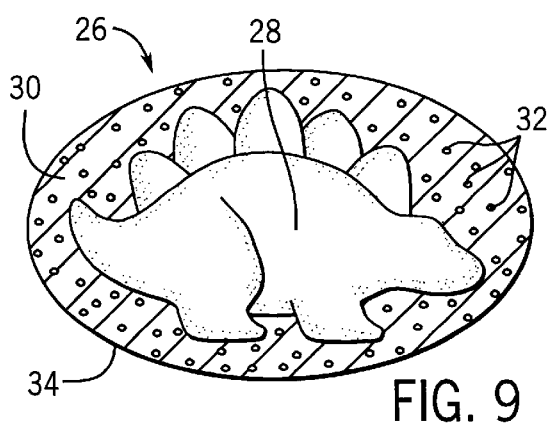
FIG. 9 is a side elevational view of an alternate embodiment food piece in accordance with the invention with a portion of the outer mass being removed to reveal the shape of the inner mass.

FIG. 9 illustrates an alternative embodiment in accordance with the invention. There is illustrated an edible food additive 26 which is composed of an inner mass in the shape of an adult dinosaur. Inner mass 28 is similar in composition to inner mass 12 and includes coatings similar to coatings 18 and 20, previously described.

Edible food additive 26 also includes an outer mass 30, which is modified from outer mass 14, previously described with respect to FIGS. 1 and 6. Outer mass 30 is water dispersible in water of about 90° F. or less. In one embodiment, outer mass 30 could be dispersible in relatively cold aqueous fluids, such as cold milk or cold water in liquid form. Suitable materials for producing an aqueous fluid dispersible outer mass 30 that disperse in aqueous fluid temperatures of about 90° F. or less include those as previously described with respect to outer mass 14. Outer mass 30 further includes a plurality of discrete particles 32 that are embedded within outer mass 30 preferably relatively close to inner mass 28 and spaced from the surface 34 of outer mass 30 and preferably only located beneath surface 34. Discrete particles 32 are composed of relatively small edible granules of solid material (which may be sugar, for example), entrained with carbon dioxide gas under super atmospheric pressure. When the gasified sugar granules come into contact with an aqueous fluid, such as water or milk, for example, the gas retained inside the carbon dioxide in outer mass 30 is released, causing a crackling sound and thereby imitating the sound of an egg cracking, thereby further adding to the animation effect. Such carbon dioxide gas entrained sugar granules are available from Zeta Espacial S.A. of Barcelona, Spain. Preferably, discrete particles have a particle size in the range of from about 0.5 to 4.5 mm. Since such material loses its carbon dioxide at between about 95–100° F. and above, care should be exercised in the selection of proper ingredients so that processing can occur at temperatures below that range. In addition, edible food additive 26 should be maintained at a temperature sufficiently below that range to avoid unwanted release of carbon dioxide gas.

Alternatively, outer mass 30 can be as previously described with respect to FIGS. 1, 6 or 9 with the addition of a material that evolves carbon dioxide upon contact with water and an acid. For example, sodium bicarbonate and a food compatible acid, such as citric acid, may be incorporated into outer mass 14 or 30. If desired, such material may be located at, near or only below the surface of outer mass 14 or 30. The location of such material within outer mass 14 and 13 can be controlled during the fat panning process, for example, by including such material during the dry charging of the fat panning process.

While the invention has been described with respect to certain preferred embodiments, it is to be understood that the invention is capable of numerous changes, modifications and rearrangements and such changes, modifications and rearrangements are intended to be covered by the following claims.

What is claimed is:

1. A food product comprising:
    an inner substantially non-dispersible in water solid edible mass contained within an outer water dispersible solid edible mass, the inner mass in the shape of an object and being different in appearance from the outer mass and of sufficient size to provide a readily discernible shape to the unaided eye.

2. The food product of claim 1 wherein the inner substantially non-dispersible in water solid edible mass is substantially insoluble and non-dispersible in hot water.

3. The food product of claim 1 wherein the outer water dispersible solid edible mass disperses in hot water but not ambient temperature water.

4. The food product of claim 3 wherein the outer water dispersible solid edible mass disperses in water above about 110° F.

5. The food product of claim 3 wherein the outer water dispersible solid edible mass comprises edible fat and sugar.

6. The food product of claim 5 wherein the outer water dispersible solid edible mass comprises about 50% edible fat and about 50% sugar by weight.

7. The food product of claim 1 wherein the inner substantially non-dispersible in water solid edible mass is composed of a core comprising sugar and an inner coating comprising wax and an outer coating comprising confectioner's glaze.

8. The food product of claim 7 wherein the core comprises tableted sugar.

9. The food product of claim 7 wherein the inner coating comprises beeswax and carnauba wax.

10. The food product of claim 7 wherein the core is water dispersible.

11. The food product of claim 1 wherein the inner substantially non-spersible in water solid edible mass is in the shape of an animal.

12. The food product of claim 1 wherein the inner substantially non-dspersible in water solid edible mass is in the shape of a dinosaur.

13. The food product of claim 1 wherein the shape of the inner substantially non-dispersible in water solid edible mass is different from the shape of the outer water dispersible solid edible mass.

14. The food product of claim 1 wherein the shape and color of the inner substantially non-dispersible in water solid edible mass are different from the shape and color of the outer water dispersible solid edible mass.

15. The food product of claim 1 wherein the inner substantially non-dispersible in water solid edible mass comprises a core composed of sugar, the sugar core having an at least substantially continuous coating that is non-dispersible in hot water.

16. The food product of claim 15 wherein the coating comprises an inner coating of wax and an outer coating of confectioner's glaze.

17. The food product of claim 1 wherein the solid edible material comprises sugar.

18. The food product of claim 1 wherein the solid edible material is located only beneath the surface of the outer water dispersible solid edible mass.

19. A food product comprising:
a substantially non-dispersible in water edible mass comprising a core comprising sugar which has an inner coating comprising wax over the core and an outer coating over the inner coating comprising confectioner's glaze, the food product being of sufficient size to provide a discernible shape to the unaided eye.

20. The food product of claim 19 wherein the wax coating comprises a mixture of beeswax and carnauba wax.

21. A method of making a food product comprising:
forming a substantially non-dispersible in water solid edible mass in the shape of an object and of sufficient size to provide a readily discernible shape to the unaided eye; and
encasing the substantially non-dispersible in water solid edible mass in an outer water dispersible solid edible mass.

22. The method of claim 21 wherein the substantially non-dispersible in water solid edible mass is formed by tableting a composition comprising primarily of sugar.

23. The method of claim 22 further comprising coating the tableted sugar composition with a coating that is non-dispersible in water.

24. The method of claim 23 wherein the coating is non-dispersible in water at a temperature of at least about 140° F. after said outer water dispersible solid edible mass has dispersed.

25. The method of claim 24 wherein the coating comprises a first coating of wax and a second coating comprising confectioner's glaze.

26. The method of claim 21 wherein said encasing step comprises fat panning dispersible-in-water edible material over the substantially non-dispersible in water solid edible mass.

27. The method of claim 26 wherein said dispersible-in-water edible material is non-dispersible in water below about 120° F. after said outer water dispersible solid edible mass has dispersed.

28. The method of claim 26 wherein said dispersible-in-water edible material comprises edible fat and sugar.

29. The method of claim 28 wherein said edible fat is present in an amount from about 40–75% and said sugar is present in an amount from about 60–25%, each by weight of the total composition of the outer mass.

30. The method of claim 28 wherein the solid edible material with entrained carbon dioxide is located only beneath the surface of said outer mass.

31. The method of claim 21 wherein said dispersible-in-water edible material comprises edible fat, sugar and solid edible material with entrained carbon dioxide.

32. The method of claim 21 wherein the inner mass has resistance to dispersion in water at a temperature of about 150° F. for at least about three to ten minutes after said outer water dispersible solid edible mass has dispersed.

33. A method of making a food product comprising:
forming a substantially water dispersible edible mass in the shape of an object;
coating the substantially water dispersible edible mass with a continuous coating of a non-dispersible in water material to render the water dispersible edible mass at least substantially non-dispersible in water, said coated solid edible mass having sufficient size to provide a readily discernible shape to the unaided eye; and
encasing the coated dispersible edible mass in a water dispersible solid edible coating.

34. The method of claim 33 wherein said continuous coating comprises an inner wax coating and an outer coating of confectioner's glaze.

35. The method of claim 34 wherein said wax coating is formed by tumbling the water dispersible edible mass in liquid wax.

36. The method of claim 33 wherein said wax coating comprises beeswax and carnauba wax.

37. The method of claim 33 wherein the food is egg-shaped.

38. The method of claim 33 wherein said encasing step is performed by fat panning.

39. The method of claim 38 wherein said fat panning comprises periodic addition of a fat panning adhesive comprising edible fat and sugar and a dry sugar charge.

40. The method of claim 39 wherein the fat panning adhesive comprises from about 40–60% edible fat and from about 60–40% sugar, by weight of the fat panning adhesive.

41. The method of claim 33 wherein said water dispersible edible coating comprises edible fat and sugar.

42. The method of claim 33 wherein the water dispersible solid edible coating is in the range of from about 0.25 mm to about 4 mm in thickness.

43. The method of claim 33 wherein the food product is egg-shaped.

44. The method of claim 33 wherein the food product is pebble-shaped.

45. The method of claim 33 wherein the outer mass disperses within about 10 seconds to about 30 seconds in water at a water temperature of about 150° F. and the inner mass has a resistance to dispersion in water at a temperature of about 150° F. for at least about three to ten minutes.

46. Animated food comprising a mixture of an edible food and an edible food additive composed of a substantially non-dispersible in water solid edible mass of sufficient size in the shape of an object to provide a readily discernible shape to the unaided eye encased in a water dispersible solid edible mass.

47. The food of claim 46 wherein the substantially water dispersible mass is substantially non-dispersible in hot water.

48. The food of claim 46 wherein the water dispersible mass is dispersible in water above about 115° F.

49. The food of claim 48 wherein the water dispersible mass disperses in water above about 125° F.

50. The food of claim 48 wherein the water dispersible solid edible mass comprises edible fat and sugar.

51. The food of claim 48 wherein said water dispersible edible mass comprises from about 40–75% sugar and from about 60–25% edible fat by weight of the water dispersible edible mass.

52. The food of claim 48 wherein said water dispersible solid edible mass disperses by melting.

53. The food of claim 46 wherein the substantially non-dispersible in water solid edible mass is composed of a core comprising sugar and an inner coating comprising wax and an outer coating comprising confectioner's glaze.

54. The food of claim 46 wherein the substantially non-dispersible in water edible solid mass is in the shape of an animal.

55. The food of claim 46 wherein the substantially non-dispersible water in edible solid mass is in the shape of a dinosaur.

56. The food of claim 46 wherein the edible food is oatmeal.

* * * * *